United States Patent
Yamashita et al.

(10) Patent No.: US 7,088,418 B1
(45) Date of Patent: Aug. 8, 2006

(54) LIQUID CRYSTAL DISPLAY DEVICE AND METHOD OF FABRICATING THE SAME

(75) Inventors: Hidefumi Yamashita, Yamato (JP); Michikazu Noguchi, Sagamihara (JP); Taroh Hasumi, Machida (JP); Tatsushi Koike, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 09/636,783

(22) Filed: Aug. 11, 2000

(30) Foreign Application Priority Data

Aug. 13, 1999 (JP) .................................. 11-229090

(51) Int. Cl.
G02F 1/1339 (2006.01)
H04B 7/14 (2006.01)

(52) U.S. Cl. .................. 349/153; 349/155; 349/190; 349/156; 455/25

(58) Field of Classification Search ................ 349/155, 349/156, 190, 153; 455/25
See application file for complete search history.

(56) References Cited

U.S. PATENT DOCUMENTS

| | | | | |
|---|---|---|---|---|
| 5,459,598 A | * | 10/1995 | Carrington | .................. 349/156 |
| 5,777,713 A | * | 7/1998 | Kimura | ....................... 349/153 |
| 5,831,710 A | * | 11/1998 | Colgan et al. | ............... 349/156 |
| 5,995,190 A | * | 11/1999 | Nagae et al. | ................ 349/156 |
| 6,219,126 B1 | * | 4/2001 | Von Gutfeld | ................ 349/153 |
| 6,266,121 B1 | * | 7/2001 | Shigeta et al. | .............. 349/156 |

FOREIGN PATENT DOCUMENTS

| EP | 0 113 064 A1 | | 7/1984 |
| EP | 0113064 A1 | * | 7/1984 |
| EP | 0 740 186 A2 | | 10/1996 |
| JP | 362052531 A | * | 3/1987 |

* cited by examiner

Primary Examiner—Andrew Schechter
Assistant Examiner—Hoan C. Nguyen
(74) Attorney, Agent, or Firm—Scully, Scott, Murphy & Presser; Robert M. Trepp, Esq.

(57) ABSTRACT

The present invention provides a liquid crystal display device having a narrow frame, which is capable of effectively removing a defective display owing to entering of a seal member to a display area. More specifically, the present invention is directed to a liquid crystal display device comprising first and second substrates 1 and 2 disposed at a predetermined gap d1; a liquid crystal sealed in the gap d1; a seal member 4 provided at the gap d1 between the first and second substrates 1 and 2 and outside a display area 3, the seal member 4 being for sealing the liquid crystal; and a wall-like structure 5 provided outside the display area 3 and inside the seal member 4, the wall-like structure 5 being made of a material different from that of the seal member 4 and composed of a plurality of rows.

3 Claims, 6 Drawing Sheets

FIG. 4
(a)
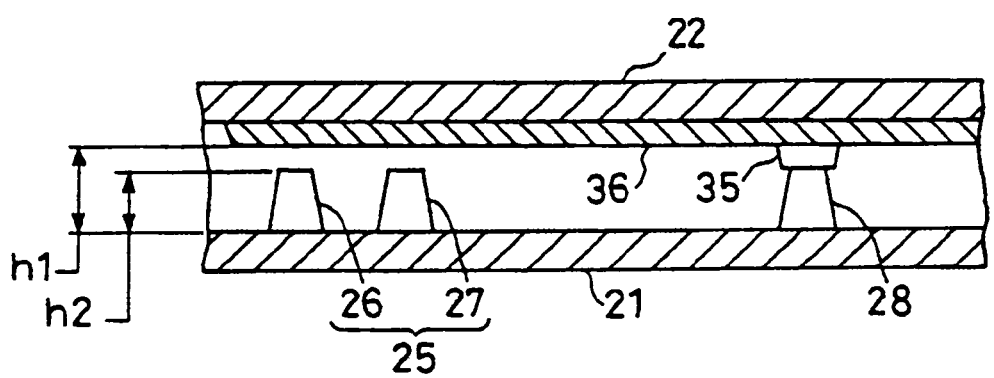
(b)
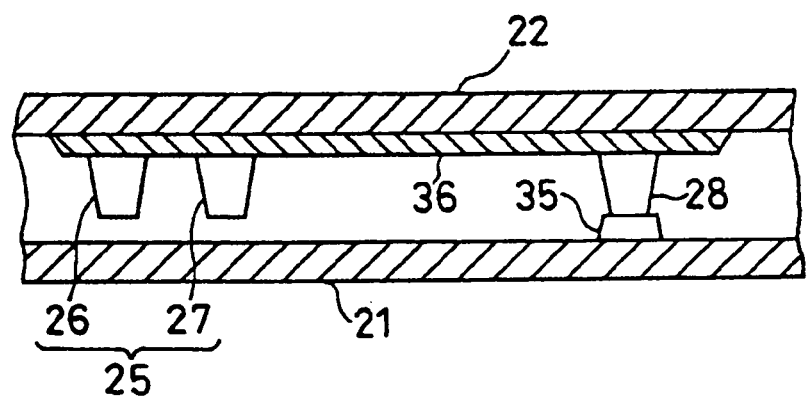

LIQUID CRYSTAL DISPLAY DEVICE AND METHOD OF FABRICATING THE SAME

BACKGROUND OF THE INVENTION

1. Technical Field

The present invention relates to a liquid crystal display device, more particularly to a liquid crystal display device which provides a seal member for sealing periphery portions of two substrates, and a method of fabricating the same.

2. Prior Art

An active matrix liquid display device which uses a thin film transistor, comprises a TFT array substrate in which gate electrodes (Y-electrode) and data electrodes (X-electrode) are arranged in the form of a matrix and thin film transistors (TFT) are disposed at intersecting points of the matrix, and an opposite substrate located so as face the TFT array substrate with a gap there between. By the thin film transistor, the liquid display device controls a voltage applied to a liquid crystal which is sealed between the TFT array substrate and the opposite substrate, and can performs an image displaying utilizing an electro-optic effect of the liquid crystal.

A seal member has been generally employed to seal a liquid crystal between two substrates made of glass or the like, which serves to guard the liquid crystal from contamination due to such as water from the outside of the device and environmental changes. This seal member is mad of thermoset resin and ultraviolet-curing resin, and formed on a periphery portion of one of the two substrates, using a painting method by means of a screen printing or a dispenser. The other substrate is adhered to one substrate on which the seal member is formed, and then both substrates are pressed to each other while heating them. In the case of the ultra-curing resin, the ultra-curing resin is cured. Thus, both substrates are joined by the seal member. Properties showing low curing temperature and free from contamination for the liquid crystal due to curing agent, besides a high mechanical adhesion strength and a high stability for environmental changes in temperature and humidity, are required for the seal member.

As background arts concerning the seal member, technologies for constituting the seal member to a double structure are disclosed in the following gazettes. For example, in Japanese Patent Laid-Open No. Sho 57(1982)-171319, notches are provided in an inner seal member of the double structure, whereby a seal width contributing to a gap regulation is made to be large. In Japanese Patent Laid-Open No. Hei 5(1993)-5890, a corner portion of the inner seal member is broken, whereby air traps, which are hollow portions created by entering of air to a place to be originally filled with the liquid crystal, is made not to be produced in the liquid crystal in injecting the liquid crystal into the double structure. Moreover, in Japanese Patent Laid-Open No. Hei 5(1993)-127177, a plurality of openings are provided in the inner seal member, whereby the liquid crystal is injected into the double structure in a short time without damaging an alignment film. In Japanese Patent Laid-Open No. Sho 64(1989)-54420, an opening portion is provided in an inner seal member, whereby a sufficient amount of a liquid crystal can be injected into an area of the inner seal member.

Furthermore, in Japanese Patent Laid-Open No. Hei 5(1993)-232482, a wall portion made of a metal wiring material is formed in a liquid crystal injection port of a single circular seal member so as to make a flow direction of the liquid crystal unchanged, thus preventing an occurrence of alignment disoderedness and defect of alignment.

Although the following technology does not directly relate to the present invention, a technology, in which an outer periphery for connecting a refection plate and a liquid crystal cell is buried with a seal member and double projections are provided inside of the seal member, is disclosed in Japanese Patent Laid-Open No. Sho 62(1987)-286018.

As described above, there are many background arts concerning the seal member. All of these background arts technologies which can be adopted when an area that is a periphery of the display area in the liquid crystal display device can be sufficiently secured. However, owing to a demand for miniaturization of the liquid crystal display device in recent years, the frame area around the display area, which is as narrow as 2 to 3 mm, must be designed. The two substrates are pressurized and heated after the two substrates are laid on top of another, so that the seal member f-lows out partially in a fluidized state. In the case of the narrow frame, the seal member sometimes spreads into the display area via wirings. Particularly, since mixed resin is used for the seal member, a flowing-out speed of the seal member differs depending on a difference in materials, and the spread of the seal member is not straight. As a result, since the seal member spreads out in a melted state while producing meanders, an area that projects significantly from the frame partially occurs. The display area in the liquid crystal display device is constituted so that the liquid crystal is ordered by an alignment film so as to be arranged correctly. If the seal member spreads into the alignment film, a thin film made of the seal member is, for example, formed on the surface of the alignment film, and the alignment of the liquid crystal is disordered. Furthermore, in the case of a normally-white mode in which upon application of a voltage, a displayed image becomes black, the portion of the display area where the seal member spread remains white in spite of the application of the voltage. Hence, there is a problem that a defective display occurs.

The present invention was made to solve such problems, and the object of the present invention is to provide a liquid crystal display device which is capable of preventing a seal member melted from flowing out into a display area.

Another object of the present invention is to provide a liquid crystal display device which is capable of preventing a defective display owing to generation of air traps in injecting a liquid crystal into a gap between superposed substrates.

Still another object of the present invention is to provide a liquid crystal display device which is capable of preventing a cell gap from being different partially from each other, which is a gap between superposed substrates.

SUMMARY OF THE INVENTION

Aiming at the above described objects, as shown in FIGS. 1(*a*) and 1(*b*), the liquid crystal display device of the present invention comprises a first substrate 1 and a second substrate 2, which are disposed at a predetermined gap d1; a liquid crystal sealed in the gap d1; a seal member 4 provided at the gap d1 between the first and second substrates 1 and 2 and outside a display area 3, the seal member 4 being for sealing the liquid crystal; and a wall-like structure 5 provided outside the display area 3 and inside the seal member 4, the wall-like structure 5 being made of a material different from that of the seal member 4 composed of a plurality of rows.

If the wall-like structure 5 is composed of the plurality of dashed line shaped rows, each of which has predetermined notches, the liquid crystal can be injected into the gap d1 fully without producing air traps in injecting the liquid crystal into the gap d1. Thus, an image quality can be improved. It should be noted that a length of the notch of the dashed row needs not necessarily to be constant.

Furthermore, if the notches of the dashed rows in the wall-like structure 5 are alternately formed in the plurality rows so that the seal member 4 does not flow out directly into the display area 3, it is preferably prevented that the seal member 4 existing around the display area 3 melts and reaches the display area 3, thus preventing the occurrence of a defective display. When the alternate formation of the notches of the plurality of rows is described in other words, it can be said that any wall of the plurality of rows of the wall-like structure 5 exists in front of the display area 3 when viewing from the seal member 4.

Furthermore, from a view point of preventing the flowing-out of the seal member 4 and from a viewpoint of designing the narrow frame, the number of the plurality of rows should be set to about two to three.

In addition, if a column-like structure 6 for keeping the gap d1 between the first and second substrates 1 and 2 constant is provided, and the shape of the wall-like structure 5 is determined based on the state of the column-like structure 6, a gap in the periphery portion having the wall-like structure 5 is not different from that of other portions. Thus, also in this point, the occurrence of the defective display can be prevented. To be more specific, an area (area for the opposite substrate) of the column-like structure 6 per a unit area (predetermined area) and an area (area for the opposite substrate) of the column-like structure 6 including the wall-like structure 5 are substantially set to be constant. With such structure, it can be preferably prevented that the gap is made to be larger by the wall-like structure 5, thus preventing the gap d1 from being disordered.

The notches of the dashed row in the wall-like structure 5 are determined based on positions of wrings formed either on the first substrate 1 or on the second substrate 2. Thus, it can be preferably prevented that the seal member 4 melts and reaches the display area 3 via the wiring.

Furthermore, if the wall-like structure 5 is constructed so that the height of the wall-like structure 5 is smaller than the gap d1 between the first and second substrates 1 and 2, though the seal member 4 partially reaches the gap of the wall-like structure 5, the seal member 4 is prevented from reaching the display are 3. In other words, by actually widening the gap of the wall-like structure 5 by capillary phenomenon, the flowing-out of the seal member 4 can be stopped at the portion of the wall-like structure 5.

Here, the wall-like structure 5 in the present invention may be provided in any of the first and second substrates 1 and 2. However, if the wall-like structure 5 is provided in a substrate in which the column-like structure 6 is formed, the wall-like structure 5 can be formed in the same patterning step as that for forming the column-like structure 6.

Furthermore, a liquid crystal display device of the present invention comprises first and second substrates 1 and 2 disposed at a predetermined gap d1, a liquid crystal sealed in the gap d1, a seal member 4 provided at the gap d1 between the first substrate 1 and the second substrate 2, the seal member 4 being disposed outside a display area 3 to seal the liquid crystal in the gap d1, and a wall-like structure 5 disposed outside the display area 3 and inside the seal member 4, the wall-like structure 5 being for preventing the seal member 4 from flowing into the display area 3.

The seal member 4 flows out in a fluidized state in pressing the second substrate 2 against the first substrates 1 while heating them. The wall-like structure 5 is capable of obstructing the invasion of the melted seal member 4 into the display area 3, and if the liquid crystal is about to flow out from the display area 3, the wall-like structure 5 enables the liquid crystal to flow outside the display area 3. Thus, the occurrence of a defective display due to the entrance of the seal member 4 melted by heating into the display area 3 can be prevented, and the liquid crystal injected can be made to prevail all over an area formed by the frame-shaped seal member 4.

In other words, the wall-like structure 5 is constructed such that the occurrence of air traps in injecting the liquid crystal to be sealed can be prevented. For example, the wall-like structure 5 can be constructed to a row structure composed of a plurality of dashed rows.

A method of fabricating a liquid crystal display device according to the present invention comprises: a wall-like structure formation step for applying resin to a first substrate 1 and patterning the resin to form a wall-like structure 5 taking a frame shape, the wall-like structure 5 surrounding a display electrode 3; a seal member applying step for applying a seal member 4 of a frame shape to a portion of the first substrate outside the wall-like structure 5 formed in the wall-like structure forming step; and adhesion step of rearranging a second substrate 2 so as to face the first substrate 1 applied with the seal member 4 in the seal member applying step, pressing the second substrate 2 against the first substrate 1, so as to adhere the first and second substrates 1 and 2 to each other by the seal member 4; and a liquid crystal injecting step for injecting a liquid crystal between the first and second substrates 1 and 2.

Here, the first substrate 1 in the present invention may be an array substrate on which a thin film transistor and the like are formed, or alternatively the first substrate 1 may be a CF substrate on which a color filter and the like are formed. In other words, they may be provided in any one of the substrates to be adhered.

In the wall-like structure formation step, if a column-like structure 6 for regulating the size of a gap between the first and second substrates 1 and 2 is formed by patterning together with the wall-like structure 5, a separate step as a column-like structure formation step needs not to be provided. Particularly, in the case where the shape of the wall-like structure 5 is determined based on the position of the column-like structure 6 instead of a spacer, the wall-like structure 5 and the column-like structure 6 can be simultaneously formed, thus improving the quality of the manufactured product.

Furthermore, if the wall-like structure 5 formed in the wall-like structure formation step is constituted by dashed rows having predetermined notches and constituted by a frame-like structure composed of a plurality of rows, the seal member 4 melted in the adhesion step is prevented from flowing out to the display area 3.

On the other hand, if in the wall-like structure forming step, photosensitive resin is applied to the first substrate 1, and if a UV exposure is performed for the resin using a photomask, followed by curing the resin, it is then possible to form the wall-like structure by patterning with a high precision.

Furthermore, if the method of fabricating a liquid crystal display device of the present invention further comprises an alignment film applying step for applying an alignment film, which is performed after the wall-like structure formation step and a seal member applying step for applying a seal member, which is formed after the alignment film applying step, the alignment film is formed after a resist step performed at the time the wall-like structure 5 is formed. Thus, the disorderedness of the alignment due to the resist step can be preferably prevented.

BRIEF DESCRIPTIONS OF THE DRAWINGS

Preferred embodiments of the present invention will now be described, by way of example only, with reference to the accompanying drawings in which:

FIGS. 1(a) and 1(b) are explanatory views for explaining a summary of a liquid crystal display device of the present invention.

FIGS. 4(a) and 4(b) are partially sectional view of the liquid crystal display device in the embodiment of the present invention.

Figure 5:
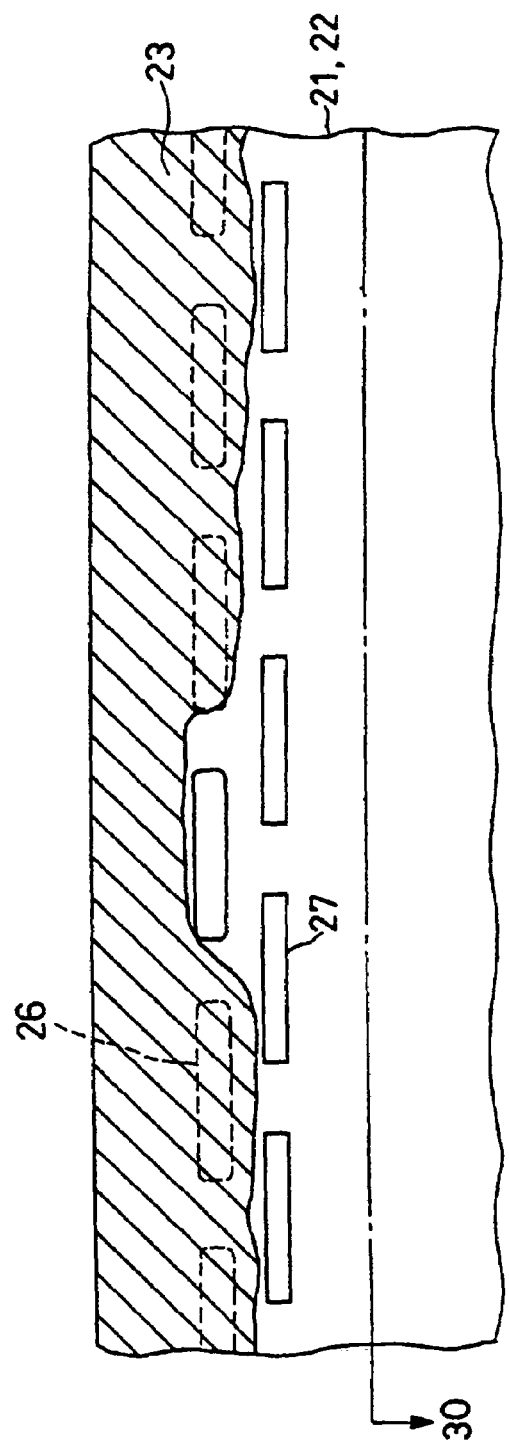

FIG. 5. is an explanatory view showing a state when both substrates are actually joined to each other.

FIGS. 1(a) to 1(e) are explanatory views for explaining a method of fabricating the liquid crystal display device in the embodiment of the present invention.

DETAILED DESCRIPTION OF THE
PREFERRED EMBODIMENTS OF THE
INVENTION

Embodiments of the present invention will be described with reference to the accompanying drawings in detail.

Figure 1:
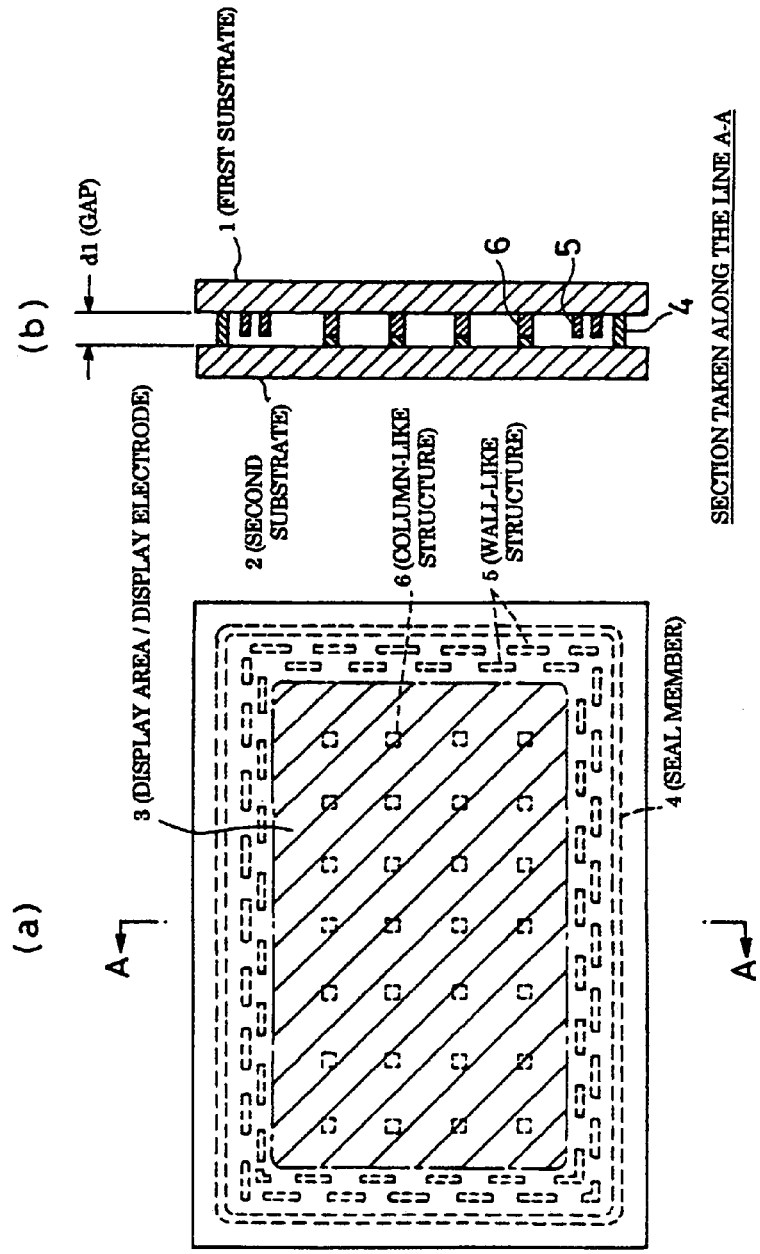
Figure 2:
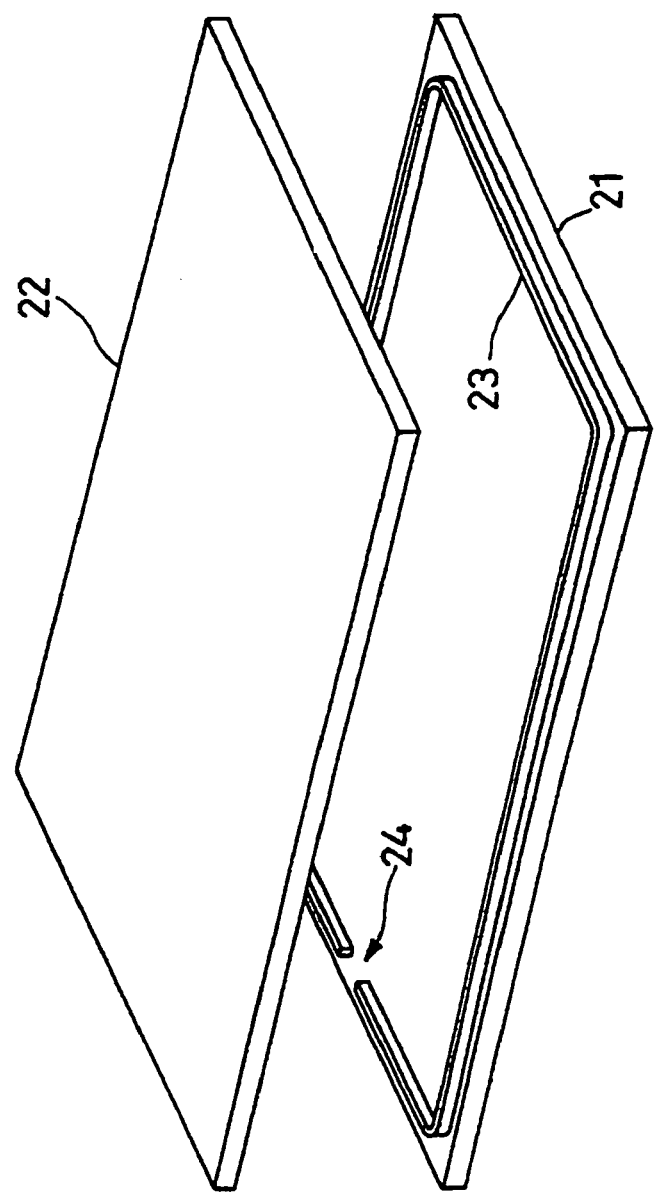
FIG. 2 is a perspective view for explaining a structure of the liquid crystal display device in an embodiment of the present invention.

FIG. 2 is a perspective view for explaining the total structure of a liquid crystal display device in this embodiment of the present invention. Reference numeral 21 denotes an array substrate that is a first substrate, and a thin film transistor (TFT), a display electrode, an alignment film and the like are formed on the array substrate 21. In this embodiment, in view of miniaturization of the device, the device is designed such that the width of a narrow frame formed between the periphery of the array substrate 2 and the display area 30 is as narrow as 3 mm or less. On the other hand, reference numeral 22 denotes a CF substrate that is a second substrate, and a black matrix, a color filter, and opposite electrode made of ITO and an alignment film are formed on the rear surface of the CF substrate 22. Moreover, at the periphery of the array substrate 21, a frame-shaped seal member 23 is formed so as to surround the display area 30 of the array substrate 21. In FIG. 2, the seal member 23 is provided on the array substrate 21. However, the seal member 23 may be provided on the CF substrate 22. Furthermore, in this embodiment, thermosetting resin made of epoxy resin containing hardening agent is used as the seal member 23. The CF substrate 22 is superposed on the array substrate 21, and 30 the pressed to each other, followed by heating both substrates. Thus, the seal member 23 is once gelatinized and then cured, whereby the array substrate 21 and the CF substrate 22 are made to be firmly adhered to each other. Moreover, a liquid crystal injection port 24 is provided in the seal member 23. After the array substrate 21 and the CF substrate 22 are firmly adhered to each other, a liquid crystal is injected to a gap between the array substrate 21 and the CF substrate 22 from the liquid crystal injection port 24. The, the liquid crystal injection port 24 is sealed by sealing agent (not shown) made of high purity silicone agent or the like.

Figure 3:
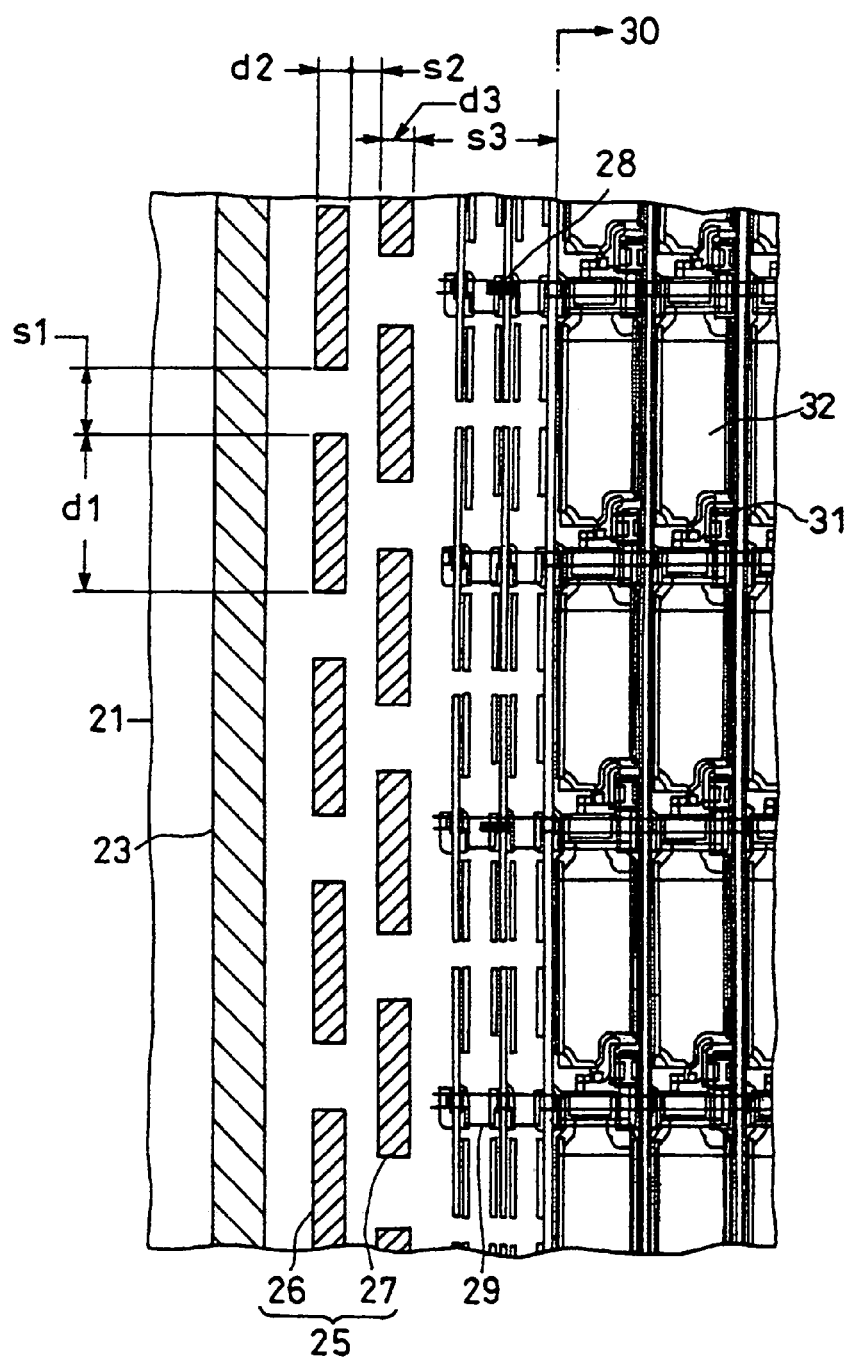
FIG. 3 is an explanatory view shown by partially enlarging an array substrate 21 in the embodiment of the present invention.

FIG. 3 is a partially enlarged explanatory view showing the array substrate 21 and constituent components provided on the array substrate 21 in this embodiment of the present invention. Although the same constituent components may be provided on the CF substrate 22, these constituent components are provided on the array substrate 21 in this embodiment.

As described above, the seal member 23 is provided on the peripheral portion of the array substrate 21, and a display area 30 having a TFT array 31 and a display electrode 32 is provided inside the seal member 23. An image is actually displayed by the display area 30. Reference numeral 28 is a column member, which is used, instead of a spacer, to regulate a cell gap that is a distance (gap) between the array substrate 21 and the CF substrate 22. The proper number of column members 28 are formed on the array substrate 21 by patterning corresponding to, for example, positions of black matrixes. Moreover, reference numeral 29 denotes an electrode (wiring) provided on the array substrate 21.

In this embodiment, a wall member 25 is provided between the seal member 23 and the display area 30. The wall member 25 is composed of two rows, each of which includes outer wall members 26 and inner wall members 27. The wall member 25 is made of ultraviolet-curing resin which is the same as that of the column member 28. The ultraviolet-curing resin is made of acrylic resin of 15 to 25%, acrylic monomer of 10 to 20% photosensitive agent of 1 to 10% and solvent of 55 to 65%. The interval between the rows of the wall member 25 is set to 5 to 300 μm, and the rows take the shape of a dashed line have notches. Moreover, the notches of the row are alternately formed so as not to exist on a line perpendicular to the rows. In other words, the notches of one row constituted by either the outer wall member 26 or the inner wall member 27 are formed so as to face any of the wall members on the opposite row. In this embodiment, as concrete dimensions, a length (d1) of the wall member 25 is set to 100 μm to 100 mm, a length (s1) of the notch is set to 5 μm to 10 mm, a width (d2) of the outer wall member 26 is set to 5 μm to 50 μm, and a width (d3) of the inner wall member 27 is set to 5 μm to 50 μm. Moreover, a distance (s3) between the display area 30 and the inner wall member 27 is set to about 95 μm, and a gap (s2) between the outer wall member 26 and the inner wall member 27 is set to 5 μm to 300 μm. The outer wall member 26 and the inner wall member 27 arranged in two rows do not necessarily take the same shape, and the shapes of them are properly determined depending on a position of a wiring member 29 and a position of a column member 28.

The reasons why the widths d2 and d3 of the outer and inner wall members 26 and 27 are set to 5 μm or more are as follows. Specifically, the outer and inner wall members 26 and 27 cannot be patterned to the widths of 5 μm or less, or they cannot be patterned precisely though the patterning is possible. On the other hand, the reason why the widths of the widths d2 and d3 of the outer and inner wall members 26 and 27 are set to 50 μm or less is as follows. Specifically, if the widths d2 and d3 are larger than 50 μm, an area ratio of the wall member 25 to the column member 25 provided in the display area 30 becomes large, and hence the gap between the array substrate 21 and the CF substrate 22 in the periphery portion, in which the wall member 25 is provided, becomes large, thus causing troubles such as a degradation of an image quality.

On the other hand, the reason why the length d1 of the wall member 25 is set to 100 μm or more is that it is difficult to prevent the seal member 23 from entering into the display area 30. The reason why the length d1 of the wall member 25 is set to 100 mm or less is that an area where the liquid crystal is not injected may be produced if the length d1 is larger than 100 mm. Moreover, the reason why the length (s1) of the notch in each row is set to 5 μm to 10 mm is as follows. Specifically, if the length (s1) of the notch is shorter than 5 μm, the notch cannot be formed precisely and air traps where the liquid crystal is not injected are produced. If the length (s1) of the notch is longer than 10 mm, the effect obtained by arranging the wall member 25 in the two rows cannot be obtained.

Moreover, the reason why the gap (s2) between the outer wall member 26 and the inner wall member 27 is set to 5 μm to 300 μm is as follows. Specifically, if the gap (s2) is less than 5 μm, it is difficult to form the gap precisely, and the liquid crystal cannot be sometimes injected to the display area 30. If the gap (s2) is more than 300 μm, it is impossible to cope with the narrow frame design.

FIGS. 4(a) and 4(b) show partial section views of the liquid crystal display device of this embodiment. Here, in the liquid crystal display device shown in FIG. 4(a), the outer wall member 26 and the inner wall member 27 constituting the wall member 25 are provided on the array substrate 21. FIG. 4(b) shows a modification of the liquid crystal display device, in which the outer wall member 26 and the inner wall member 27 constituting the wall member 25 are provided on the CF substrate 22.

In FIG. 4(a), the outer wall member 26 and the inner wall member 27 are formed by the same patterning processing for the column member 28. In this embodiment, the height of the outer and inner wall members 26 and 27 is set to about 4.5 μm. A coloring layer 36 is formed on the opposite CF substrate 22, and a facing-to-column member 35 is stacked on the coloring layer 36 by patterning. The column member 28 and the facing-to-column member 35 serve to keep the cell gap h1 at about 4.8 μm, which is a gap formed by the array substrate 21 and the CF substrate 22. As a result, the array substrate 21 and the CF substrate 22 are joined in a state that the outer wall member 26 and the inner wall member 27 create a gap of about 0.3 μm between the tops of the members 26 and 27 and the opposite substrate (electrode).

On the other hand, compared to FIG. 4(a), the wall member 25 and the column member 28 may be formed on the CF substrate 22 side by patterning, and the facing-to-column member 35 may be stacked on the array substrate 21 side, as shown in FIG. 4(b). Particularly, as shown in FIG. 4(a), if the wall member 25 and the column member 28 having a large height are provided on the array substrate 21 side, the heights of the wall member 25 and the column member 28 are disturbed by other film formation steps, while the high projections apply the large impact on other steps. For this reason, it will be effective to provide the wall member 25 and the column member 28 having the high height on the CF substrate 22 side not on the array substrate 21 side, in which complicated film formation steps are performed.

FIG. 5 shows an explanatory view showing a situation that after formation of the seal member 23 the array substrate 21 and the CF substrate 22 are actually superposed, and pressed to each other while heating them.

By the pressing and heating treatment, the seal member 23 is gelatinized and flows out, as shown in FIG. 5. Since mixed resin is used for the seal member 23, a flowing-out speed of the seal member 23 is different due to a difference of material, and the spread is not straight. As a result, the melted seal member 23 tends to flow out while producing a meander line. In this embodiment, paying attention to the difference in the viscosities of the liquid crystal of a viscosity of 1 Pa·s or less, which is injected later, the seal member 23 of a viscosity of 10 to 100 Pa·s and a seal member (not shown) of a viscosity of 10 to 500 Pa·s, the liquid crystal display device is constructed such that although the liquid crystal can enter the display area 30 without being obstructed by the outer and inner wall members 26 and 27 of the wall member 25, the seal member 23 and the seal member once collide with the wall member 25 so as not to enter the display area 30 by being obstructed by the wall member 25. Specifically, as shown in FIG. 5, the gelatinized seal member 23 collides with the outer wall member 25. Specifically, as shown in FIG. 5, the gelatinized seal member 23 collides with the outer wall member 26, and, by capillary phenomenon, spreads through the gap between the outer wall member 26 and one of the substrate 21 and the coloring layer 36, that is, the gap (h1–h2) shown in FIGS. 4(a) and 4(b). Then, the seal member 23 reaches the inner wall member 27. However, the entry of the seal member 23 into the display area 30 is stopped by the inner wall member 27, and the seal member 23 can be prevented from entering directly the display area 30.

On the other hand, since the liquid crystal to be injected into the cell gap afterward shows a low viscosity, the entry of the liquid crystal into the display area 30 is never obstructed by the outter and inner wall members 26 and 27 constituting the wall member 25. In other words, the wall member 25 has no influence on the injection of the liquid crystal into the cell gap sealed by the seal member 23. That is, the liquid crystal is sufficiently injected into the cell gap without producing any air traps. Particularly, since the wall member 25 forms the dashed line having the notches, the liquid crystal can enter the back side of the wall member 25, and can prevents the occurrence of the air traps.

As described above, according to the structure of the wall member 25 in this embodiment, since the seal member 23 showing a high viscosity can spread through the gap between the wall member 25 and the opposite substrate by capillary phenomenon, the seal member 23 never enters the display area 23 directly, and it is possible to prevent the disorderdness of the alignment due to the entrance of the seal member 23. On the other hand, with respect to the seal member 23 showing a low viscosity, the liquid crystal can flow into a sealed area formed by this seal member 23. As a result, the occurrence of air traps to be formed in an area where no liquid crystal flows into can be prevented, thus preventing a defective display owing to the protrusion of the air trap of the liquid crystal into the display area 30.

Furthermore, in this embodiment, the width and length of the wall member 25 and the length of the notch of the wall member 25 are determined, based on the position of the column member 28, so that a ratio of an area of the wall member 25 to the opposite substrate and that of the column member 28 to the opposite substrate are equal to each other. This makes it possible to keep substantially constant the cell gap that is a gap formed by the array substrate 21 and the CF substrate 22, thus preventing the occurrence of trouble which causes a defective display owing to a large gap between these substrates in the periphery portion where the wall member 25 is formed.

FIGS. 6(a) to 6(e) show a method of fabricating the liquid crystal display device in this embodiment. It should be noted that in FIGS. 6(a) and 6(e), although descriptions are made for an example in which the wall member 25 and the column member 28 are formed on the array substrate 21, the wall member 25 and the column member 28 can be formed on the CF substrate 22 as described above.

Figure 6:
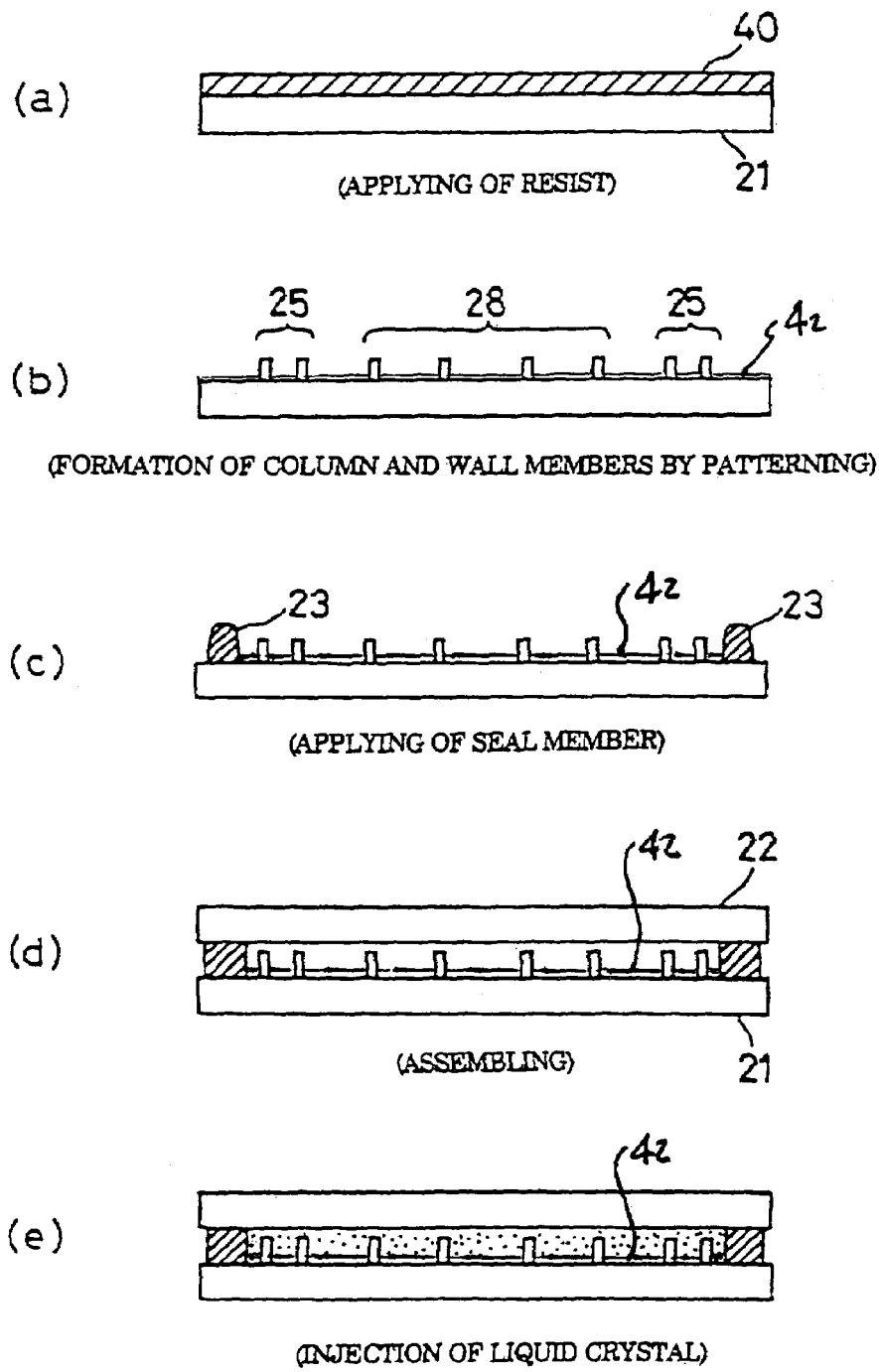

First, FIG. 6(a) shows a resist applying step. In the applying step, ultraviolet-curing resin 40 made of photosensitive acrylic resin is applied (resist coating) onto the array substrate 21 made of a glass substrate to a thickness of about 5 μm. Polyamide resin is used instead of the acrylic resin depending on the structure of the CF substrate 22.

Next, the procedure advances to a patterning step for forming the wall member 25 and the column member 28 shown in FIG. 6(b). In this patterning step, a UV exposure is first performed using a photomask. A negative formed by the UV exposure can be obtained. That is, the portions of the photosensitive ultraviolet-curing resin 40 radiated by a light are cured, thus obtaining the basic structures of the wall member 25 and the column member 28. As a matter of course, in the UV exposure, the basic structures of them can be also obtained by a positive. Thereafter, an alkali developing is performed to remove uncured portions, and the array substrate 21 is washed out and dried. The cured resin is baked at a temperature of about 230 EC. The resin forming the wall member 25 and the column member 28 are fully hardened by this baking. After the wall member 25 and the column member are formed, a polyimide alignment film 42 is applied to the surface of the array substrate 21. The reason why the step for applying the alignment film is performed after the formation of the wall member 15 and the column member 28 is that the execution of the resist step after applying the alignment film disorders the alignment.

Subsequently, the procedure advances to a step for applying the seal member 23 shown in FIG. 6(c). In this embodiment, the seal member 23 using thermosetting resin made of epoxy resin is formed to a frame-like shape outside the wall member 26 formed in the step shown in FIG. 6(b). The seal member 23 is applied using a dispenser method in a state that the seal member 23 has a somewhat high height for the necessary cell gap. At this time, a liquid injection port for injecting the liquid crystal later is provided.

Next, the procedure advances to an assembly step shown in FIG. 6(d). In this step, the CF substrate 22 that is an opposite substrate on which the alignment film is pressed against the array substrate 21 on which the wall member 25, the column member 28 and the seal member 23 are formed, thus firmly adhering them to each other. To be more specific, after the CF substrate 22 is superposed on the array substrate 21, if the size of the substrates are 360 mm×460 mm, a pressure of a little less than 1 ton is applied and heated at a temperature of about 150° C. The seal member 23 melts by heating and is gelatinized. Thereafter, the seal member 23 becomes cured resin from fluid resin by a curing reaction of curing agent contained therein. Thus, the seal member 23 is firmly adhered to the CF substrate 22, and the array substrate 21 and the CF substrate 22 are joined to each other in a state that the cell gap, which is the gap decided by the column member 28 and the foregoing facing-to-column member 35, is kept. In the embodiment, when the array substrate 21 and the CF substrate 22 are joined, the gelatinized seal member 23 enters the gap formed between the wall member 25 and the opposite substrate (CF substrate 22) by the capillary phenomenon. Thus, the gelatinized seal member 23 never reaches the display area 30 composed of a display electrode and the like, and the remains at the position of the wall member 25 to harden there.

Finally, the procedure advances to a liquid crystal injection step shown in FIG. 6(e). A sealed area by the seal member 23 is made to be vacuous, and the liquid crystal is injected from the liquid crystal injection port 24. Since the injected liquid crystal shows a very low viscosity, regardless of the wall member 25, the liquid crystal reaches the display area 30 beyond the wall member 25. As a result, it is possible to perform the injection of the liquid crystal without producing the air traps. Thereafter, the liquid crystal injection port 24 is stopped by a seal member, thus finishing a series of fabrication steps.

According to the method of fabricating a liquid crystal display device in this embodiment, the array substrate 21 and the CF substrate 22 can be joined by the seal member 23 while keeping the cell gap between the both substrate constant all over the both substrates. The occurrence of the air traps in injecting the liquid crystal can be prevented, so that it will be possible to fabricate a high reliability liquid crystal display device. Moreover, the wall member 25 which inhibits the entry of the seal member 23 to the display area 30 is patterned simultaneously with the column member 28, so that an especial step for forming the wall member 25 needs not to be performed.

As described above, accordingly to the present invention, in the liquid crystal display device having a narrow frame in first and second substrates, defects of the liquid crystal display device by the entry of the seal member to the display can be effectively removed.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A liquid crystal display device which has first and second substrates disposed with a predetermined gap formed therebetween, and seals a liquid crystal in the gap, comprising:

a seal member provided in the gap between said first and second substrates, said seal member being disposed outside a display area to seal said liquid crystal;

a wall-like structure disposed outside the display area and inside the seal member, a column-like structure formed by a column member (28) and a thereto-facing column member (35), each said member (28, 35) being separately formed on said first and second substrates, for keeping the gap between said first and second substrates constant, wherein said column member is formed by the same patterning process of said wall-like structure, and a shape of said wall-like structure is determined based on a state of said column-like structure, said wall-like structure being formed to a height which is lower than that of the gap formed between said first substrate and said second substrate, wherein a minor space is formed between a free end of said wall-like structure and the adjacent substrate for reducing the meniscus of liquid crystal material flowing through said space, said wall-like structure being made of a different material from that of said seal member and formed in plural rows; said wall-like structure being composed of dashed rows having notches; said notches of said wall-like structure being formed alternately in staggered relationship in each of the plurality of dashed rows such that the notches in one row of said plural wall-like structure are always offset relative to the notches in another row of said wall-like structures along the lengths of said wall-like structures whereby one said wall-like structure forms a barrier to a direct flow of said seal material through gaps formed by the notches in another said wall-like structure so that said seal material does not flow directly into said display area from exteriorly of said wall-like structures, wherein positions of the notches of the plural dashed rows in said wall-like structure are determined based on a position of a wiring formed either on said first substrate or on said second substrate, wherein said wall-like structure is composed of dashed rows having notches, and wherein the positions of the notches of the plural dashed rows in said wall-like structure are determined based on a position of a wiring formed either on said first substrate or on said second substrate.

2. A liquid crystal display device which has a first substrate and a second substrate disposed with a predetermined gap formed therebetween, and seals a liquid crystal in the gap, comprising:
 a seal member provided in the gap between said first and second substrates, said seal member being disposed outside a display area to seal said liquid crystal in said gap; and
 a wall-like structure comprising a plurality of parallel rows of alternatingly staggered notched walls disposed outside said display area and inside said seal member, such that the notches in one row of said plural wall-like structure are always offset in staggered relationship relative to the notches in another row of said wall-like structures along the lengths of said well-like structures and forming an undulating passageway whereby one said wall-like structure forms a barrier to a direct flow of said seal material through gaps formed by the notches in another said wall-like structure, said wall-like structure being formed to a height lower than that of the gap formed between said first substrate and said second substrate, wherein a minor space is formed between a free end of said wall-like structure and the adjacent substrate for reducing the meniscus of liquid crystal material flowing through said space, said wall-like structure being provided for preventing said seal member from flowing into said display area from exteriorly of said wall-like structure, wherein there is provided a column-like structure formed by a column member (28) and a thereto-facing column member (35), each said member (28, 35) being separately formed on said first and second substrates, for keeping the gap between said first and second substrates constant, wherein said column member is formed by the same patterning process of said wall-like structure, and a shape of said wall-like structure is determined based on a state of said column-like structure, wherein said seal member flows out in a fluidized state when said second substrate is pressed into said first substrate while heating said first and second substrates, and said wall-like structure is capable of stopping said seal member from entering said display area, through said staggered notched walls said seal member being in a fluidized state, and permitting said liquid crystal to flow into outside the wall-like structure when said liquid crystal flows out from said display area, and wherein said wall-like structure prevents air traps from occurring when said liquid crystal to be sealed flows into said display area.

3. A method of fabricating a liquid crystal display device, comprising the steps of:
 applying resin onto a first substrate, and patterning said resin to form a frame-shaped wall-like structure surrounding a display electrode; said wall-like structure comprising a frame-shaped structure composed of a plurality of rows, each row showing a dashed line shape have predetermined notches in staggered offset relationship to each other such that the notches in one row of said plural wall-like structure are always offset relative to the notches in another row of said wall-like structures along the lengths of said well-like structures so as to inhibit flow of said seal member therethrough towards said liquid crystal whereby one said wall-like structure forms a barrier to a direct flow of said seal material through gaps formed by the notches in another said wall-like structure;
 arranging a second substrate so as to face said first substrate on which said seal member is applied, and pressing said second substrates to each other by said seal material;
 a column-like structure for regulating and maintaining constant a size of the gap between said first and second substrates being formed by coupling a column member (28) and a thereto-facing column member (35), each said member (28, 35) being separately formed on said first and second substrates, wherein said column member is formed with said wall-like structure by patterning through the same patterning process; and
 injecting a liquid crystal into a gap between said first and second substrates, which are adhered to each other, wherein said wall-like structure is formed to a height which is lower than that of the gap formed between said first substrate and said second substrate by applying photosensitive resin onto said first substrate, wherein a minor space is formed between a free end of said wall-like structure and the adjacent substrate for reducing the meniscus of liquid crystal material flowing through said space, performing a UV exposure for the resin using a photomask, and curing the resin, and wherein an alignment film is applied after the formation of said wall-like structure, and then said seal member is applied outside said wall-like structure.

* * * * *

UNITED STATES PATENT AND TRADEMARK OFFICE
CERTIFICATE OF CORRECTION

| | |
|---|---|
| PATENT NO. | : 7,088,418 B1 |
| APPLICATION NO. | : 09/636783 |
| DATED | : August 8, 2006 |
| INVENTOR(S) | : Hidefumi Yamashita et al. |

It is certified that error appears in the above-identified patent and that said Letters Patent is hereby corrected as shown below:

Column 11, Line 29, Claim 2:
"well-like" should read -- wall-like --

Column 12, Line 21, Claim 3:
"well-like" should read -- wall-like --

Signed and Sealed this

Twelfth Day of December, 2006

JON W. DUDAS
*Director of the United States Patent and Trademark Office*